(12) United States Patent
Kazenas et al.

(10) Patent No.: US 10,043,166 B1
(45) Date of Patent: Aug. 7, 2018

(54) SYSTEM AND METHOD FOR PROVIDING WARNING AND PROTECTION FOR BILL PAYMENTS

(71) Applicant: United Services Automobile Association (USAA), San Antonio, TX (US)

(72) Inventors: Joseph Alfred Kazenas, Boerne, TX (US); Teddy Joseph Edmond Voutour, Helotes, TX (US)

(73) Assignee: UNITED SERVICES AUTOMOBILE ASSOCIATION (USAA), San Antonio, TX (US)

(*) Notice: Subject to any disclaimer, the term of this patent is extended or adjusted under 35 U.S.C. 154(b) by 610 days.

(21) Appl. No.: 13/759,858

(22) Filed: Feb. 5, 2013

Related U.S. Application Data

(63) Continuation of application No. 12/500,653, filed on Jul. 10, 2009, now Pat. No. 8,380,591.

(51) Int. Cl.
*G06Q 20/14* (2012.01)
(52) U.S. Cl.
CPC .................................. *G06Q 20/14* (2013.01)
(58) Field of Classification Search
CPC ...................................................... G06Q 20/14
USPC .................. 705/30, 35, 40, 42, 80; 235/380; 380/286, 30
See application file for complete search history.

(56) References Cited

U.S. PATENT DOCUMENTS

| | | | |
|---|---|---|---|
| 5,182,705 A | 1/1993 | Barr et al. | |
| 5,383,113 A | 1/1995 | Kight et al. | |
| 5,649,117 A | 7/1997 | Landry | |
| 5,684,965 A | 11/1997 | Pickering | |
| 5,689,649 A | 11/1997 | Altman et al. | |
| 5,704,045 A | 12/1997 | King et al. | |
| 5,799,086 A * | 8/1998 | Sudia | G06Q 20/02 380/286 |
| 5,903,881 A | 5/1999 | Schrader et al. | |
| 5,956,700 A | 9/1999 | Landry | |
| 5,974,146 A | 10/1999 | Randle et al. | |
| 5,978,780 A | 11/1999 | Watson | |
| 6,006,205 A | 12/1999 | Loeb et al. | |
| 6,128,603 A | 10/2000 | Dent et al. | |
| 6,269,347 B1 | 7/2001 | Berger | |
| 6,269,348 B1 | 7/2001 | Pare, Jr. et al. | |
| 6,315,196 B1 * | 11/2001 | Bachman | 235/380 |

(Continued)

OTHER PUBLICATIONS

Herigstad, Sally, "Protecting Your Credit Score When Paying Down Debt," Credit Cards.com, 3 pages, Jun. 5, 2009.

(Continued)

*Primary Examiner* — Vanel Frenel
(74) *Attorney, Agent, or Firm* — Perkins Coie LLP

(57) ABSTRACT

Methods and systems for providing protection to an individual or party from penalties associated with late or missed payments of bills, invoices and other charges are described. The methods and systems can warn a user of possible penalties and take correction action to avoid incurring the penalty. In an example, a computerized method, and system for performing the method can include receiving data about a plurality of payments to be paid by at least one party, the data includes at least one penalty associated with at least one of the payments, ranking the payments based at least partially upon the penalty and determining an order for the payments to be paid.

18 Claims, 10 Drawing Sheets

(56) References Cited

U.S. PATENT DOCUMENTS

| | | | |
|---|---|---|---|
| 6,330,548 B1* | 12/2001 | Walker | G06Q 10/087 705/26.1 |
| 6,360,209 B1 | 3/2002 | Loeb et al. | |
| 6,839,687 B1 | 1/2005 | Dent et al. | |
| 7,117,172 B1* | 10/2006 | Black | G06Q 40/00 705/30 |
| 7,240,028 B1 | 7/2007 | Rugge | |
| 7,283,977 B1 | 10/2007 | Tyson-Quah | |
| 7,324,970 B2 | 1/2008 | Magruder et al. | |
| 7,454,381 B2* | 11/2008 | Walker | G06Q 10/087 705/37 |
| 7,647,268 B1* | 1/2010 | Bonner | G06Q 20/10 705/35 |
| 7,890,393 B2* | 2/2011 | Talbert et al. | 705/35 |
| 8,200,527 B1 | 6/2012 | Thompson et al. | 705/7.39 |
| 8,332,244 B1* | 12/2012 | Karam et al. | 705/4 |
| 8,447,667 B1* | 5/2013 | Dinamani et al. | 705/31 |
| 2003/0126047 A1 | 7/2003 | Hollar et al. | |
| 2003/0139985 A1* | 7/2003 | Hollar | G06Q 30/06 705/30 |
| 2003/0191711 A1* | 10/2003 | Jamison | G06Q 20/04 705/40 |
| 2004/0062370 A1* | 4/2004 | O'Neal et al. | 379/112.01 |
| 2004/0143524 A1* | 7/2004 | Hilton | G06Q 10/04 705/35 |
| 2004/0210521 A1* | 10/2004 | Crea | G06Q 20/04 705/40 |
| 2005/0075977 A1* | 4/2005 | Carroll | G06Q 20/102 705/40 |
| 2005/0144119 A1* | 6/2005 | Monsen | G06Q 10/10 705/38 |
| 2005/0187843 A1 | 8/2005 | Lapsley et al. | |
| 2006/0033625 A1* | 2/2006 | Johnson | G09Q 10/10 340/573.1 |
| 2006/0059073 A1* | 3/2006 | Walzak | G06Q 40/00 705/35 |
| 2006/0184450 A1* | 8/2006 | Ely et al. | 705/38 |
| 2008/0052208 A1 | 2/2008 | Neece et al. | |
| 2008/0228645 A1* | 9/2008 | Gallon | G06Q 20/04 705/40 |
| 2008/0249936 A1* | 10/2008 | Miller et al. | 705/40 |
| 2008/0319863 A1* | 12/2008 | Jung et al. | 705/14 |
| 2009/0048957 A1* | 2/2009 | Celano | G06Q 40/06 705/35 |
| 2009/0070244 A1* | 3/2009 | Gallon | G06Q 20/04 705/34 |
| 2009/0265262 A1 | 10/2009 | Chaudhari | |
| 2010/0017413 A1* | 1/2010 | James | 707/10 |
| 2010/0042517 A1 | 2/2010 | Paintin et al. | |
| 2010/0241501 A1* | 9/2010 | Marshall | 705/14.13 |
| 2011/0282778 A1* | 11/2011 | Wright | G06Q 20/04 705/38 |

OTHER PUBLICATIONS

Irby, LaToya, "How to Protect Your Credit Score," About.com, 3 pages, Jan. 7, 2008.

Irby, LaToya, "15 Things That Hurt Your Credit Score," About.com, 7 pages, 2009.

LendingTree, LLC., "10 Tips to Protect Your Credit Score," 4 pages, 2008.

* cited by examiner

SYSTEM AND METHOD FOR PROVIDING WARNING AND PROTECTION FOR BILL PAYMENTS

CROSS-REFERENCES TO RELATED APPLICATIONS

This application is a continuation of U.S. patent application Ser. No. 12/500,653, filed Jul. 10, 2009, now U.S. Pat. No. 8,380,591, entitled "SYSTEM AND METHOD FOR PROVIDING WARNING AND PROTECTION FOR BILL PAYMENTS," the entire disclosure of which is herein incorporated by reference for all purposes.

FIELD

This application relates to methods and systems for providing protection to an individual or party from penalties associated with late or missed payments of bills, invoices and other charges. The method and system can warn a user of possible penalties and take correction action to avoid incurring the penalty.

BACKGROUND

Electronic bill payment systems allow a consumer, party or bill paying entity (payer(s)) to direct their bank, an agent of their bank, or a non-bank bill payment service or bureau to pay amounts owed to merchants, service providers and other billers (payee(s)) who bill or invoice consumers for amounts owed. A bill payer is any person or entity paying a bill, invoice, loan, or making a payment. A bill issuing party is any person or entity sending or issuing bills, loans, invoices or requests for payments.

Unfortunately, some bill issuers impose penalties on the bill payer in the event of late, partial or missed payments. Some examples of these types of penalties are late fees, interest rate increases, credit score reductions, accelerated payments, increased payments, line of credit reductions and reduced ability to borrow. Many bill issuers such as credit card companies take any opportunity to raise interest rates and collect late fees.

In some cases, the penalty is out of proportion to the amount and timing of the payment. For example, if a payment is one day late, the interest rate on a credit card may be increased by 100 percent or the entire credit card balance may become immediately due. In some situations, the penalty may cause undue hardship for the bill paying party.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an example, a computerized method, and system for performing the method can include receiving data about a plurality of payments to be paid by at least one party, the data includes at least one penalty associated with at least one of the payments, ranking the payments based at least partially upon the penalty and determining an order for the payments to be paid. The method can include communicating the order for the payments to the party. The method can include communicating the penalty associated with the payment to the party. The method can include paying at least one of the payments to prevent the occurrence of the penalty. The method can include determining the occurrence of a duplicate payment. The method can include allowing the party to select at least one action to prevent the occurrence of the penalty. The method can include the penalty being at least one of a late fee, an interest rate increase or a credit rating reduction.

In an example, a computerized method, and system for performing the method can include receiving data about a plurality of bills for at least one user, determining at least one action to prevent incurring a penalty for at least one of the bills and allowing the user to select the action. The method can include performing the action to prevent incurring the penalty. The method can include communicating the penalty to the user. The method can include paying at least one of the bills. The method can include determining the occurrence of a duplicate payment. The method can include determining at least one of the bills as the highest priority for payment. The method can include communicating the action to the user.

In an example, a computerized method, and system for performing the method can include receiving data for a plurality of bills for at least one user, determining if at least one penalty event can occur and communicating the penalty event to the user. The method can include determining an action to prevent incurring the penalty. The method can include performing the action. The method can include paying at least one of the bills. The method can include determining the occurrence of a duplicate payment. The method can include determining at least one of the bills as the highest priority for payment. The method can include determining an order of payment for the bills.

In further examples, the above method steps are stored on a machine-readable medium comprising instructions, which when implemented by one or more processors perform the steps. In yet further examples, subsystems or devices can be adapted to perform the recited steps. Other features, examples, and embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for interface presentation are described. In the following description, for purposes of explanation, numerous specific details are set forth in order to provide a thorough understanding of example embodiments. It will be evident, however, to one skilled in the art that the present invention may be practiced without these specific details.

Figure 1:
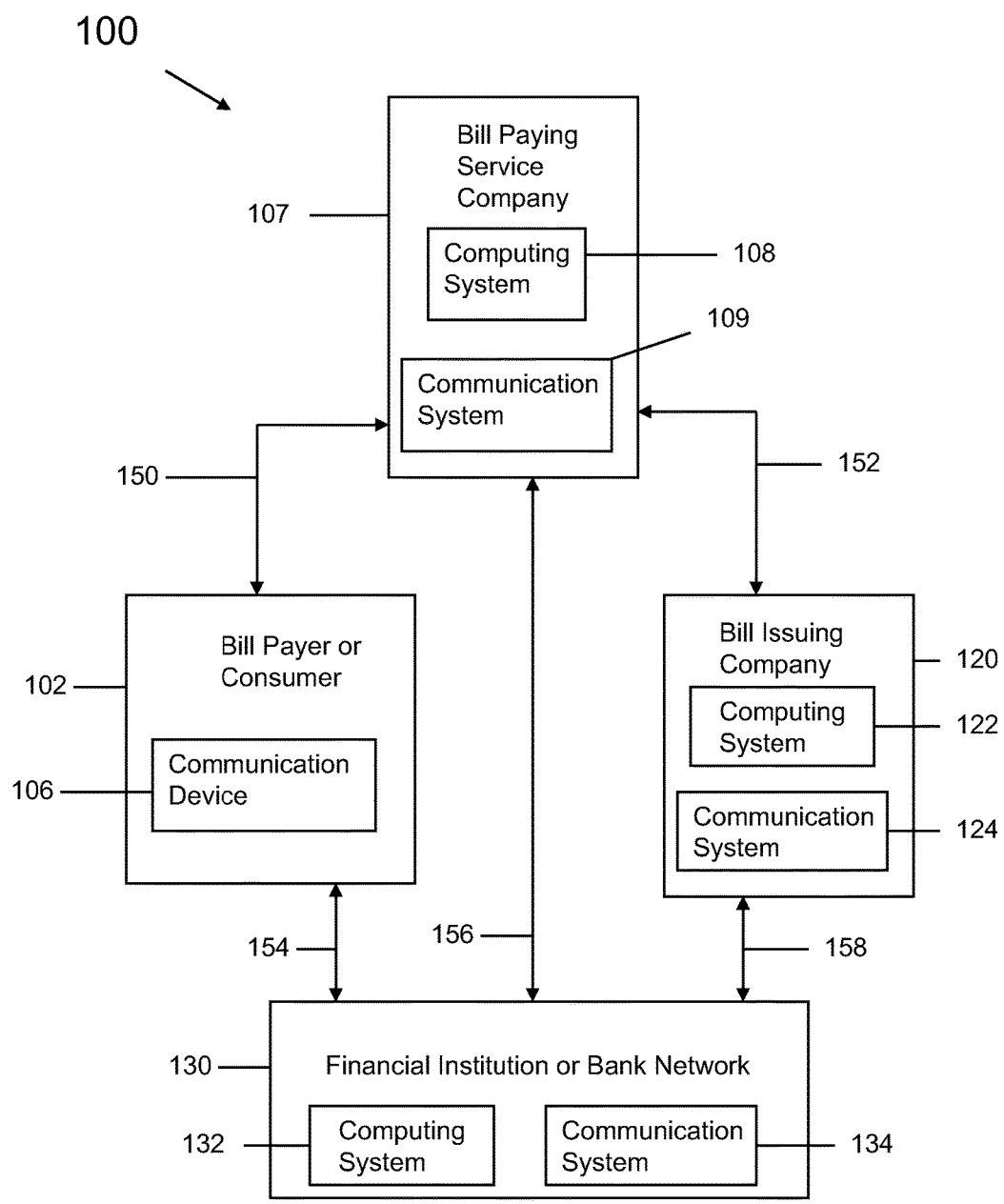
FIG. 1 is a schematic diagram of a system according to an example embodiment.

FIG. 1 illustrates an example computer and communication system 100 which can include an individual or party, such as a bill paying consumer or party 102, who can communicate with a bill paying service or bill paying service company 107 through a communication network 150 and a bill issuer or payee company 120 that can communicate with the bill paying service company 107 through a communication network 152.

The terms, "consumer", "user", "party", "bill paying party", "bill payer" or "payer", as used herein broadly refers to any person or entity paying a bill, invoice or making a payment, be it a utility customer, a taxpayer paying a tax, a customer making a credit card payment or a borrower repaying a loan.

The terms, "service provider", "bill issuer", "billing party", "bill issuing party", "billers" and "payee" as used herein broadly refers to any person or entity sending or issuing bills, invoices or requests for payments. For example, credit card companies, telephone, companies, utility companies, loan companies, insurance companies and other merchants may issue bills for goods and services that are provided.

Bill paying party 102, bill paying service company 107 and bill issuing company 120 can each be in communication with a financial institution or bank network 130. Bill paying party 102 is in communication with the financial institution network 130 through communication network 154. Bill paying service company 107 is in communication with the financial institution network 130 through communication network 156. Bill issuing company 120 is in communication with the financial institution network 130 through communication network 158.

The bill paying party or bill payer 102 in the present description is a person, company or entity that makes payments for bills, invoices, loans and any type of payment. Examples of bills or payments can include mortgages, car loans, credit card bills, electric bills, water bills, gas bills, insurance bills, invoices, store bills, telephone bills, television service bills and tax bills. Bills or invoices are debit statements issued by providers of goods and services.

The bill paying party or bill payer 102 can use a wide variety of communication devices 106 to communicate with and provide data to the bill paying service insurance company 107. Many people today have mobile devices such as personal data assistants, mobile telephones, laptop computers, email devices, netbooks, etc. These devices provide various means of communication. The insured can also have communication devices 106, such as land based telephones, computers, faxes, social networking sites, networked email, pagers, internet, etc. Certain information is associated with the bill paying party or bill payer 102 that relates the bill paying party or bill payer 102 with the bill paying service company 107. While shown with the bill paying party or bill payer 102, it will be recognized that this information can be stored at the bill paying service company 107 as well. It is also recognized that the bill paying service company 107 may cause statements to be printed and mailed in order to communicate with the bill paying party or bill payer 102.

The bill paying service or bill paying service company 107 is a company that provides a service of allowing bill payers to pay bills and/or making payments for a bill payer. The bill paying service company can be a standalone company or may be part of a financial service company or organization. For example, the bill paying service company may be part of an insurance company, bank, credit union, mutual fund or other financial entity.

The bill paying service company 107 includes a computing system 108 and a communication system 109. The computing system includes a payment database, an accounting system, and a business rules system. Each of these systems can further include a storage system, an application system, and a server and can support multiple users at any given time.

Within the computing system 108 are databases that store data with regard to the bill paying party. The database can contain data on due dates, payments, account balances, loan balances, credit scores, interest rates, penalties for late or missed payments, credit and debit data and other terms and conditions associated with the payments. The computing system 108 and communication system 109 will be described in greater detail below with regard to FIG. 2.

The bill issuing company 120 can be a company that provides goods services in exchange for a payment or can be a company that collects payments on behalf of other parties. For example, bill issuing company 120 can be a mortgage company, loan company, credit card company, electric company, water company, gas company, insurance company, telephone company, television service provider company or government entity. Bills or invoices are debit statements issued by a provider of goods and services in return for goods and services.

The bill issuing company 120 includes a computing system 122 and a communication system 124. The computing system includes a database, an accounting system, and a business rules system. Each of these systems can further include a storage system, an application system, and a server and can support multiple users at any given time. The bill issuing company 120 can use a wide variety of communication devices to communicate with and exchange data to the bill paying service company 107. In an example, if the bill issuing company 120 is a credit card company, the credit card company may provide information on payments due and terms and conditions of the payments including any penalties for missed or late payments.

Certain information is associated with the bill paying party that relates the bill paying party with the bill paying service company and with the bill issuing company. This information can be stored at the bill paying service company, the bill issuing company or at both companies.

Within the computing system 122 are databases that store data with regard to the due dates, payments, account balances, loan balances, credit scores, interest rates, penalties for late or missed payments, credit and debit data and other terms and conditions associated with the payments.

The financial institution or bank network 130 can be a group or network of financial institutions that facilitate the transfer of money and funds between parties. For example, the bank network may be part of the ACH system that facilitates wire transfer of funds between accounts or may be part of a check clearing system. The transfer of funds can include currency exchanges and the like.

The financial institution or bank network 130 includes a computing system 132 and a communication system 134. The computing system includes a database, an accounting system, and a business rules system. Each of these systems can further include a storage system, an application system, and a server and support multiple users at any given time. The financial institution or bank network 130 can use a wide variety of communication devices to communicate with and exchange data with the bill payer 102, bill paying service company 107 and bill issuing company 120.

Figure 2:
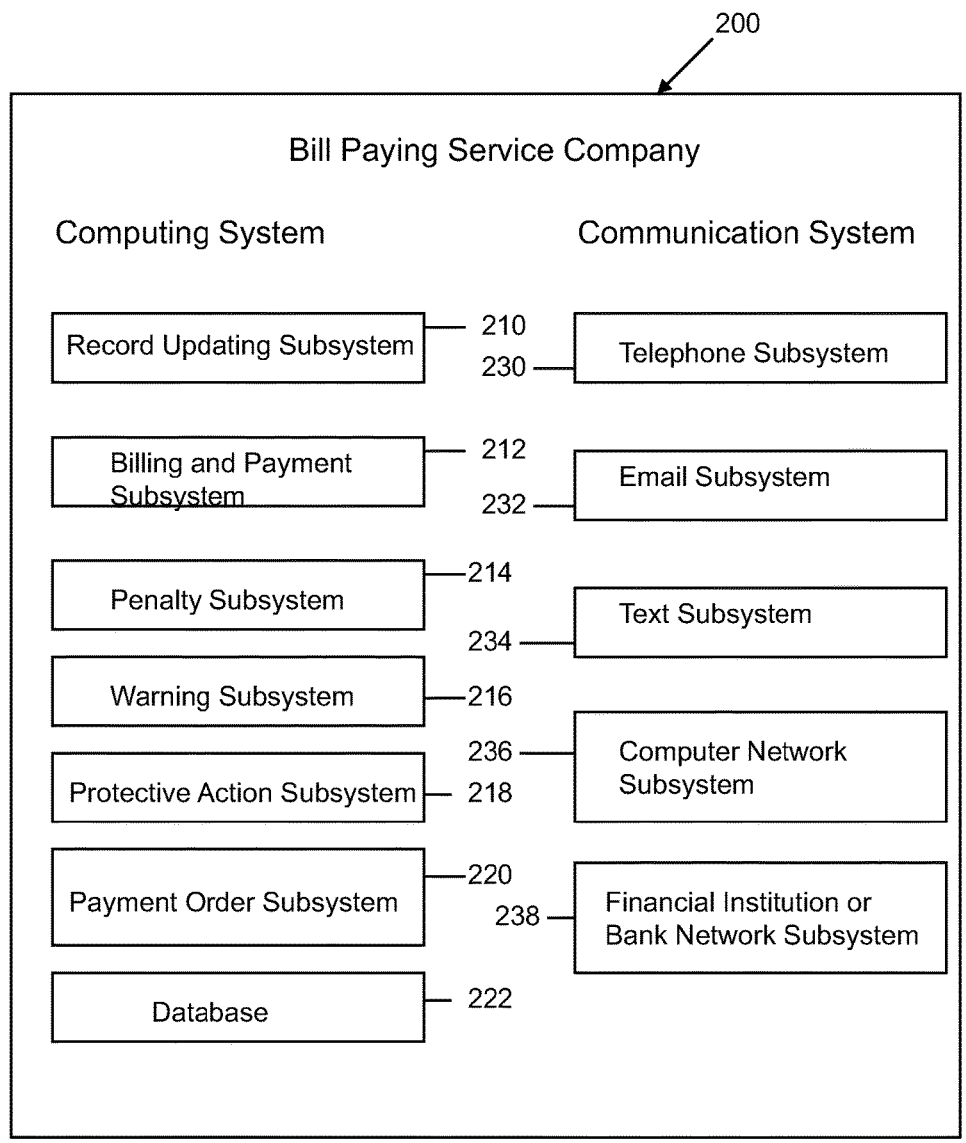
FIG. 2 is a schematic diagram of a company computing and communication system according to an example embodiment.

FIG. 2 illustrates a schematic view of a system 200 including various devices of the bill paying service company 107 of FIG. 1. The bill paying service company system 200 includes a computing system and a communication system that can each include a plurality of subsystems that are information handling systems that execute processes and perform operations (e.g., processing or communicating information) in response thereto, as discussed further below. Each such subsystem is formed by various electronic circuitry components. In an example, any of the components of the computing machine 1100 (FIG. 10) can be included in a subsystem. The subsystems can each communicate with each other over a bus system (not shown).

A record updating subsystem 210 provides an interface to a bill payer to update data records related to the bill payer. Subsystem 210 provides a graphical user interface to a user to input data such as, contact information, secondary contact information, emergency numbers, email addresses, text addresses, account numbers and any other information needed to facilitate payments. The subsystem 210 can prompt the insured for this information at the time of setting up an account or at a later time. Further subsystem 210 can prompt a telephone representative to request this information from the bill paying party. Subsystem 210 can access database 222 or can keep a database of user records.

A billing and payment subsystem 212 keeps track of bills received, payments sent, accounts credited and debited and account balances. Billing and payment subsystem 212 can cause bills and account statements to be sent to the bill paying parties and bill issuing companies. Billing and payment subsystem 212 can receive data on bills, payments and loans that are to be paid from bill issuing companies and loan companies. Billing and payment subsystem 212 can collect data that is associated with each bill received and each payment that is to be made. For example, terms and conditions that apply when bills are paid late, not paid or are partially paid.

Billing and payment subsystem 212 can be configured to automatically receive bills and make payments from an account or may allow the bill paying customer to direct payments through a communication device such as a graphical user interface. Subsystem 212 can receive data on amounts due, due dates, late fees, minimum payments, credit score effects, interest rate effects, line of credit effects and any other penalties for late or missed payments. Subsystem 212 can access database 222 or can keep a database for each bill or payment that is to be paid.

A penalty subsystem 214 keeps track of penalties that are associated with each bill or payment that is to be made. Subsystem 214 can keep track of terms and conditions that apply when bills are paid late, not paid or are partially paid. Subsystem 214 can track, detect and determine, due dates, late fees, minimum payments, credit score effects, interest rate effects, line of credit effects and any other penalties for late or missed payments. Subsystem 214 can access database 222 or can keep a database of penalties for each bill or payment that is to be paid. In an example, all possible penalties are stored separately. These penalties are not initially associated with any particular bills or payments. At a later time the penalties are matched to a financial transaction such as a bill payment.

Warning subsystem 216 issues warnings or notices to the bill paying party or bill payer that a penalty event associated with a payment will occur now or in the future. For example, warning subsystem 216 can send an e-mail to the bill paying customer five days before a late fee is incurred on a credit card reminding the bill payer that they have five days left to make the payment without being charged a late fee. Warning subsystem 216 communicates warnings by various means using communication system 109 (FIG. 1). Subsystem 216 can access database 222 or can keep a database of warnings for each bill or payment that is to be paid.

Protective action subsystem 218 performs protective actions that protect the bill paying customer from incurring penalties associated with missed or late payments. In an example, the protective action occurs automatically such as when a payment is automatically made from an account before a due date. Protective action subsystem 218 can track, detect, predict and determine that a penalty event will occur in the near future and take an action to prevent the occurrence of the penalty event. For example, if a late fee will apply if a bill is not paid in the next hour, protective action subsystem 218 can automatically pay the bill before the late fee is incurred. Protective action subsystem 218 performs protective actions by various means using communication system 109 (FIG. 1) and/or through network 156 (FIG. 1) with bank network 130 (FIG. 1). Subsystem 218 can access database 222 or can keep a database of protective actions for each bill or payment that is to be paid.

Payment order subsystem 220 determines or generates a sequence, order or hierarchy of bill payments that are the most advantageous for the bill paying party. The order of payments are determined that protect the bill paying customer from incurring any penalties or incurring the least penalties associated with missed or late payments. In an example, the payment order subsystem 220 can determine that a mortgage payment has the highest priority for being paid on time and an electric bill has a lower priority for being paid on time. Payment order subsystem 220 can communicate a preferred payment order or sequence to the bill paying party by various means using communication system 109 (FIG. 1). Payment order subsystem 220 can access database 222 or can keep a database of billing data for each bill or payment that is to be paid.

A database 222 stores the data for the company and can include magnetic storage, optical storage, or electronic storage of data. The database 222 can include a wide variety of data such as bill payer and bill issuer identification, bills, payments, due dates, late fees, minimum payments, credit score effects, interest rate effects, line of credit effects, penalties for late or missed payments, penalty warnings, protective actions and order of payments.

A telephone subsystem 230 includes devices that can communicate thorough telephone systems, e.g., those based on "plain old telephone service" (POTS), Public Switched Telephone Network (PSTN), voice over IP (VOIP),), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, and others. Telephone subsystem 230 can communicate to the bill paying party at contacts stored in the database of the company.

An email subsystem 232 includes devices and systems that can send an email communication to the bill paying party at contacts stored in the database of the company.

A text subsystem 234 includes devices and systems that can send an electronic text communication to the bill paying party at contacts stored in the database of the company.

A computer network subsystem 236 includes devices and systems that interface with other computer networks.

A financial institution or bank network subsystem 238 includes devices and systems that interface with other financial institutions and banks using a secure network.

Figure 3:
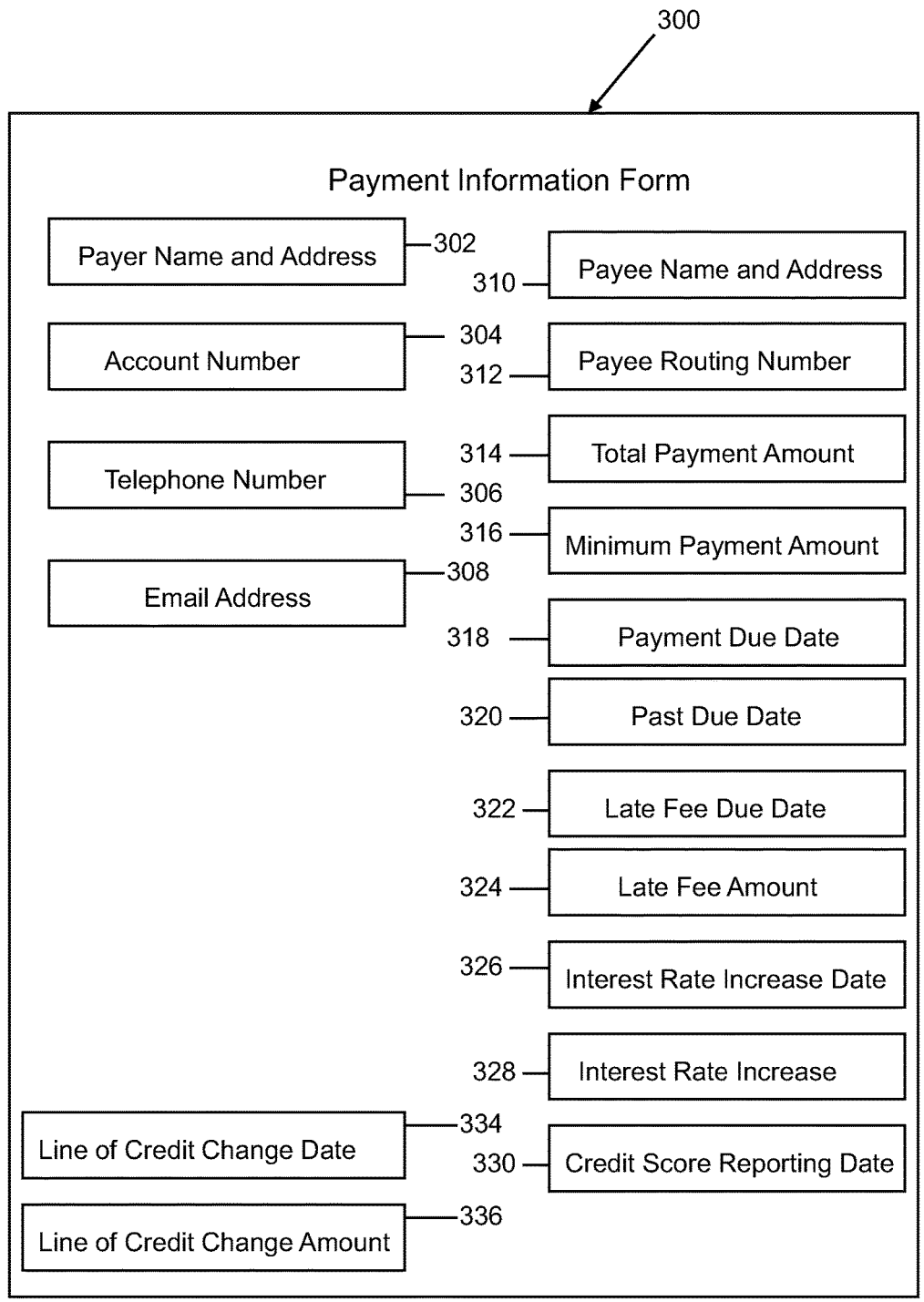
FIG. 3 is a schematic diagram of a user input screen or form according to an example embodiment.

FIG. 3 illustrates a payment information form 300 that can be displayed on a graphical user interface, stored in a database, or printed. Payment information form 300 can allow a bill paying party or bill payer to input data about bills and payments to be made to a database such as database 222 (FIG. 2). In an example of the present invention, many of the form fields are automatically populated with data in the company database or from a loan or bill issuing company database once the loan or bill issuing company is identified.

Payment information form 300 includes fields 302-336 that represent data related to payments and bills. Field 302 represents the bill paying party's or payer's name and address. Field 304 represents the account number. Field 306 represents the bill paying party's or payer's telephone number(s). Field 308 represents the bill paying party's email address(es).

Field 310 represents the bill issuing party's or payee's name and address. Field 312 represents the bill issuing party's or payee's account routing number. The account routing number is an account number associated with the payee's bank or financial institution and is used to facilitate monetary transfers. Field 314 represents the total amount of the payment due. Field 316 represents the minimum payment that is due. Field 318 represents the payment due date. Field 320 represents the date on which the payment is considered past due. The past due date may be the same or different than the due date. Field 322 represents the late fee due date. The late fee due date is the date on which a late fee is charged to the account of the bill payer. Field 324 represents the late fee amount.

Field 326 represents the interest rate increase date. The interest rate increase date is the date on which the bill issuing party will increase the interest rate on the bill payer's loan, bill or balance that is due to be paid. The interest rate increase date would typically occur after a payment has been missed or is paid late. Field 328 represents the interest rate increase amount. The interest rate increase amount can be expressed in percent. In an example, the interest rate may be increased ten percent in the event of a missed or late payment. Field 330 represents the credit score reporting date. The credit score reporting date is the date on which the bill issuing party will report a payment that has been missed or is paid late to a credit reporting bureau or agency. The reporting of missed or late payments typically will result in the lowering of a credit score for the bill paying party. This is not an exhaustive list of all fields in form 300. These fields represent both fields that can be automatically completed or must await later entry.

Field 334 represents a line of credit change. The line of credit change date is the date on which the bill issuing party will reduce the amount of available credit to the bill paying party. The line of credit may be associated with a loan or a credit card. The line of credit change date would typically occur after a payment has been missed or is paid late. Field 336 represents the line of credit change amount. The line of credit change amount is the amount by which a line of credit may be decreased. In an example, the line of credit may be decreased by $5000 in the event of a missed or late payment.

Field 330 represents the credit score reporting date. The credit score reporting date is the date on which the bill issuing party will report a payment that has been missed or is late to a credit reporting bureau or agency. The reporting of missed or late payments typically will result in the lowering of a credit score for the bill paying party. This is not an exhaustive list of all fields in form 300. These fields represent both fields that can be automatically completed or must await later entry.

Figure 4:
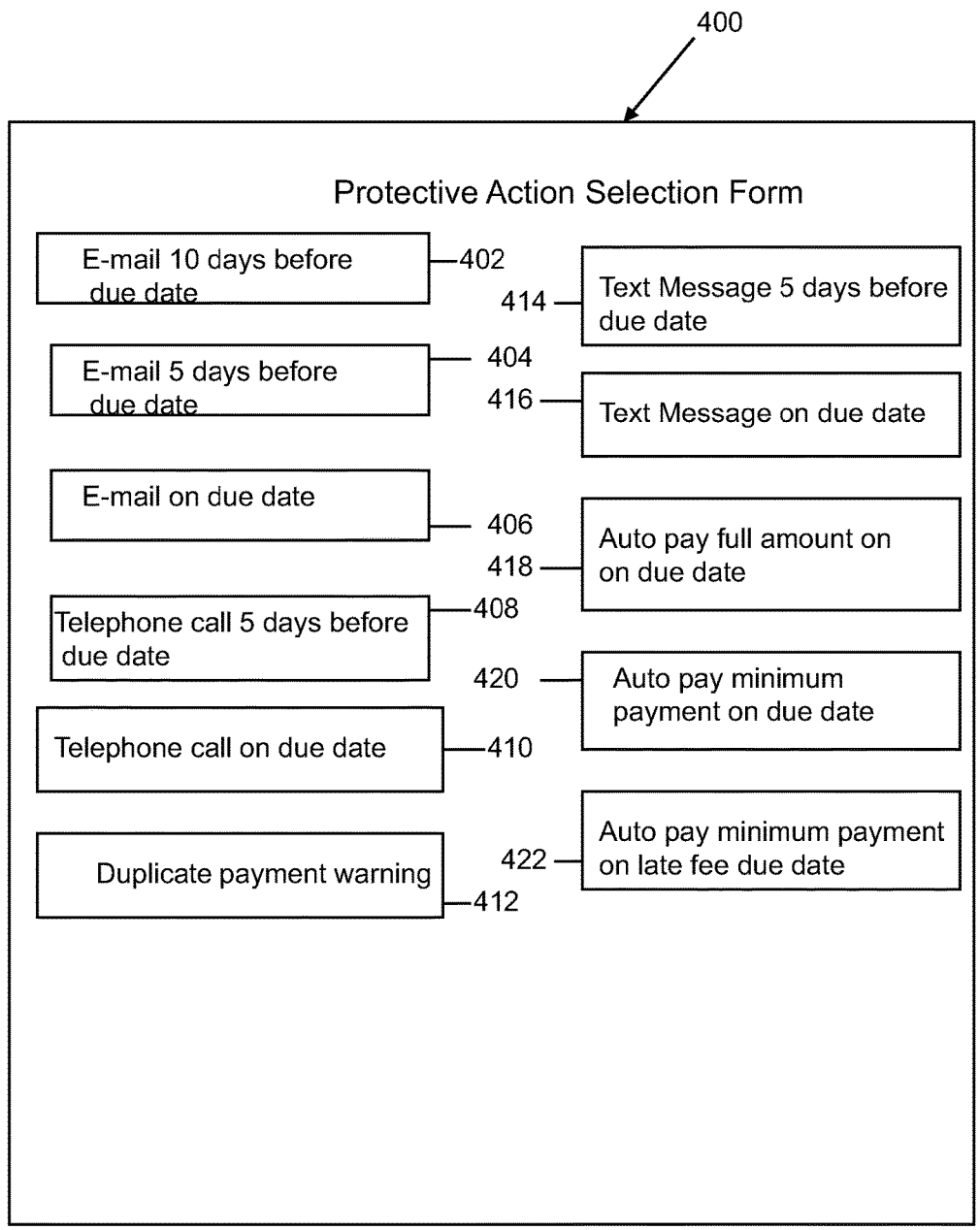
FIG. 4 is a schematic diagram of a user selection screen or form according to an example embodiment.

FIG. 4 illustrates a protective action selection form 400 that can be displayed on a graphical user interface, stored in a database, or printed. Protective action selection form 400 allows a bill paying party or bill payer to make selections and provide instructions to computer system 108 (FIG. 1) about which actions are to be taken when a penalty event is determined or which actions are to be taken to avoid incurring a penalty from a penalty event. Protective action selection form 400 may be stored in a database such as database 222 (FIG. 2). In an example of the present invention, some of the form fields are automatically populated with data in the company database or from a loan or bill issuing company database once the loan or bill issuing company is identified.

Protective action selection form 400 includes fields 402-422 that represent data related to actions to inform and protect the bill payer from penalties. Field 402 represents an e-mail being sent to the bill paying party 10 days before the due date of the bill. The e-mail reminds the bill payer to take action by making a payment to avoid incurring a penalty for a late or missed payment. Field 404 represents an e-mail being sent to the bill paying party 5 days before the due date of the bill. Field 406 represents an e-mail being sent to the bill paying party on the due date of the bill. Field 408 represents a telephone call being placed to the bill paying party 5 days before the due date of the bill. The telephone call reminds the bill payer to take action by making a payment to avoid incurring a penalty for a late or missed payment. The telephone call may be automatically generated by computer system 108 (FIG. 1). Field 410 represents a telephone call being placed to the bill paying party on the due date of the bill. Field 414 represents a text message being sent to the bill paying party 5 days before the due date of the bill. The text message reminds the bill payer to take action by making a payment to avoid incurring a penalty for a late or missed payment. The text message may be automatically generated by computer system 108 (FIG. 1). Field 416 represents a text message being sent to the bill paying party on the due date of the bill.

Communications to the bill paying party may be monitored to ensure that the warnings are received. In the case of e-mails, a return receipt can be requested. For a telephone call, the call can be automatically monitored to ensure a person answers the phone and the message is received.

Field 412 represents a warning that a duplicate payment has been made for a bill or is about to be made. The duplicate payment warning can be sent to the bill paying party during a bill payment session, if the occurrence of a duplicate payment is determined. The duplicate payment warning can also be sent after a duplicate payment has been made. Field 418 represents the automatic payment of the full amount of a bill on the due date. Selection of field 418 causes the bill paying service company computer system to make a full payment for the amount due on the due date of the bill. The funds for payment of the bill can be provided in a separate account or may be transferred from a financial institution account through a financial institution network 130 (FIG. 1). Field 420 represents the automatic payment of a minimum payment for a bill on the due date. Selection of field 420 causes the bill paying service company computer system to make the minimum payment on the due date of the bill. Field 422 represents the automatic payment of a minimum payment for a bill on the late fee due date. Selection of field 422 causes the bill paying service company computer system to make the minimum payment on the date that a late fee is charged for a bill. This is not an exhaustive list of all fields in form 400. These fields represent both fields that can be automatically completed or must await later entry.

Figure 5:
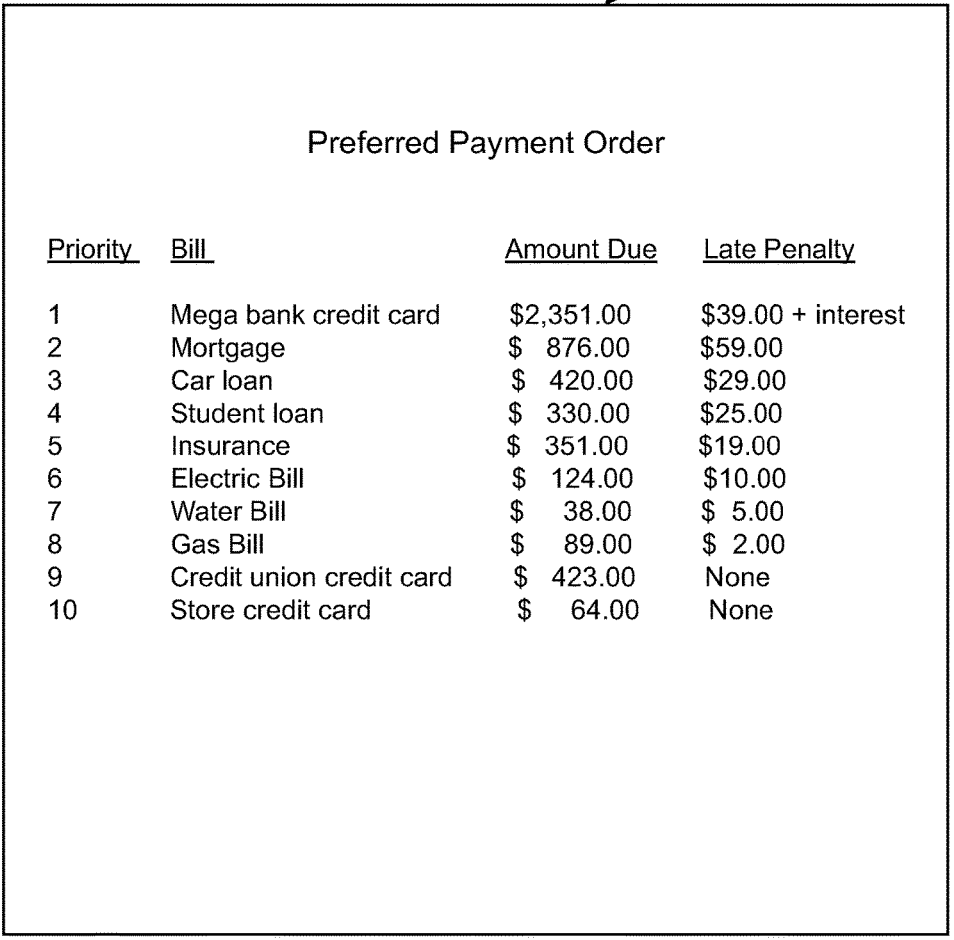
FIG. 5 is a schematic diagram of a payment order screen according to an example embodiment.

FIG. 5 illustrates a preferred payment order list or statement 500 that can be displayed on a graphical user interface, stored in a database, or printed. Preferred payment order 500 details the preferential order of payment of several bills or loans that minimizes the cost and effect of any penalties for missed or late payments. Preferred payment order statement 500 is calculated or generated by payment order subsystem 220 (FIG. 2) using data from database 222 (FIG. 2). Preferred payment order statement 500 may be stored in a database such as database 222 (FIG. 2). Preferred payment order statement 500 has five columns titled priority, bill, amount due and late penalty. In an example shown in FIG. 5, a bill payer can have bills or loans from a mega bank credit card, mortgage, car loan, student loan, insurance, electric bill, water bill, gas bill, credit union credit card and a store credit card. The priority column indicates the most advantageous order in which bills should be paid that minimizes the costs associated with penalties for missed or late payments. The amount due column indicates the amount due for each bill or loan and the late penalty column indicates the late penalty for each bill or loan. In FIG. 5, preferred payment order statement 500 indicates that the mega bank credit card bill should be paid first. The mega bank credit card bill has the highest penalty for being late or missed. The mortgage payment should be paid second and has the second highest penalty for being late or missed. The car loan should be paid third, the student loan is fourth, the insurance bill is fifth, the electric bill is sixth, the water bill is seventh, the gas bill is eighth and the credit union credit card bill is ninth to be paid. The store credit card should be paid tenth or last in this example. The store credit card has no penalties associated with a late or missing payment.

In an example, preferred payment order statement 500 can be printed and mailed to a bill paying party in advance of the due dates or may be shown to a bill paying party on a graphical user interface during an online bill paying session. In an example, preferred payment order statement 500 can be e-mailed to a bill payer on a periodic basis in advance of bill due dates.

Figure 6:
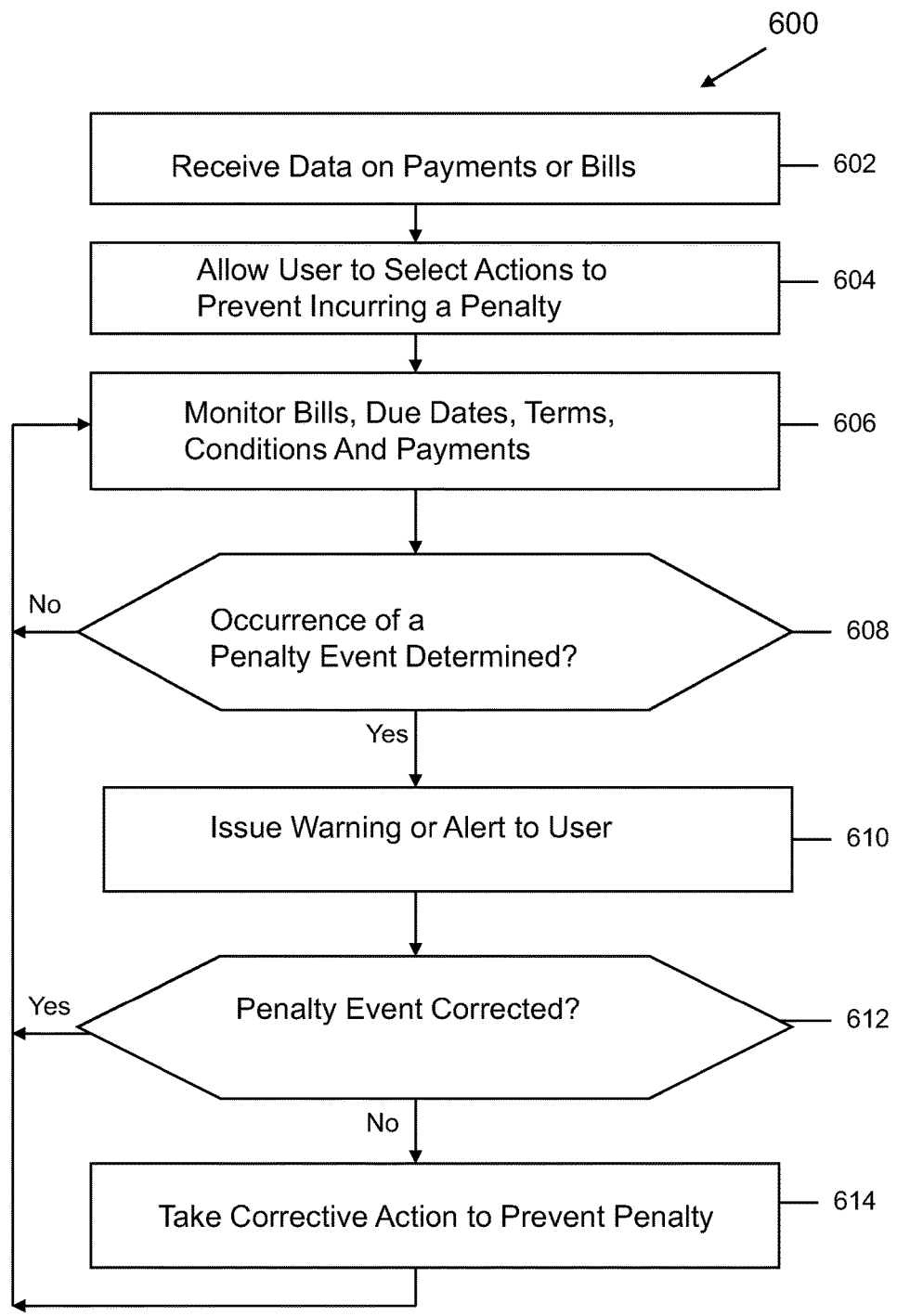
FIG. 6 is a flow chart of a method according to an example embodiment.

FIG. 6 illustrates a flow chart of a method 600 for providing protection to a bill paying party from penalties associated with late or missed payments of bills, invoices and other charges. This method provides warnings and takes automatic actions in the event that a bill payment is determined to be late, missed or partially paid. Method 600 is performed using the bill paying service company computer system 108 (FIG. 1).

At 602, data is received about bills, loans and payments for a bill paying party that are to be paid. This can include data retrieved from a bill or loan issuing company database or can be directly input by the bill paying party via a communication device such as over the internet. The data can include information such as the bill paying party's name, address, telephone number(s), email address(es), account numbers and bank account numbers. The data can include data about bills to be paid such as terms and conditions that apply when bills are paid late, not paid or are partially paid. The data can include information such as the bill issuing company's name, address, telephone number(s), email address(es), account numbers and bank account numbers. The data further can include amounts due, due dates, late fees, late fee due dates, minimum payments, loan balances, credit score effects, interest rate effects, line of credit effects and any other penalties for late or missed payments.

The data can be received by the bill paying service company computer system via a communication device such as over networks like internet or other electronic communication networks. The data may be in printed form and may be manually entered into bill paying service company database. Alternatively, the data may be entered using a semi-manual method such as electronic scanning or optical character recognition.

The data received at step 602 can be stored in a database or electronic memory device and used for other steps and systems so that additional computations can occur. Storage can be in the company database, for example, in electronic memory devices.

At 604, a bill paying party or user is allowed to select protective actions to prevent the occurrence of penalty events from late, missed or partial payments of bills. A list of protective actions can be determined from the data received in step 602 or may be determined using the bill paying service company computer system and database. The list of protective actions can include sending warning e-mails, telephone calls and text messages before the due date of the bill. The list of protective actions can further include sending a duplicate payment warning. The list of protective actions can further include automatic payments for full or minimum amounts due prior to the incurrence of a penalty.

At 606, bills, loans, due dates, payments and terms and conditions are monitored for the future, near term and present occurrence of penalty incurring events. Monitoring can be performed continuously or periodically using the bill paying service company computer system and database.

At decision 608, the occurrence of a penalty incurring event is determined. The penalty event can be a late fee, service cancellation, an interest rate increase, a line of credit decrease or a credit score decrease. If a penalty event is not determined, method 600 returns to step 606. If a penalty event is determined, method 600 proceeds to step 610.

At 610, an alert, protective action or warning of the occurrence of a potential penalty event is communicated to the bill paying party or user through at least one communication channel. The warning can include sending warning e-mails, faxes, telephone calls and text messages before the date of the penalty event. The warning can further include the printing of separate warning letters or the printing of warnings on account statements. The bill paying service company computer system can automatically send out warnings through at least one communication channel. The communication of the warning may be monitored to ensure that it is received.

At decision 612, it is determined if the penalty event has been corrected or prevented from occurring. In an example, if the amount due on a bill has been paid in advance of the due date, decision 612 can determine that a penalty event will not occur such as a late fee being charged. If the penalty event has been corrected, method 600 returns to step 606. If the penalty event has not been corrected, method 600 proceeds to step 614.

At 614, a corrective action is taken to prevent or avert the occurrence of a penalty event. The corrective action can include automatic payments of full, partial or minimum amounts of a bill or loan. The funds for payment of the bill or loan can be provided in a separate account or may be transferred from a financial institution account through a financial institution network 130 (FIG. 1). The bill paying service company computer system can automatically make payments to prevent a penalty form being incurred through at least one financial network. The payment may be monitored to ensure that it is received by the bill or loan issuing party. After step 614, method 600 returns to step 606 to continue monitoring bills, loans, due dates and terms and conditions of payments.

In an example, method 600 may communicate with the bill issuing party to ensure that payment has been received and that no penalties will be incurred or charged to the bill paying party. Method 600 may send a message to the bill issuing party requesting confirmation that payment has been received and that no penalties or penalty charges will be applied to the bill payer's account.

In an example, method 600 may also determine if a duplicate payment has been made or will be made and communicate a duplicate payment warning to the bill paying party. A notice of the duplicate payment may also be sent to the bill issuing party to obtain a refund of the duplicate payment.

Method 600 can provide an intelligent bill paying system that can protect against penalties for late, missed or partial payment. Method 600 can prevent an account from becoming delinquent, avoid interest rate increases and can protect the bill payer's credit score.

Figure 7:
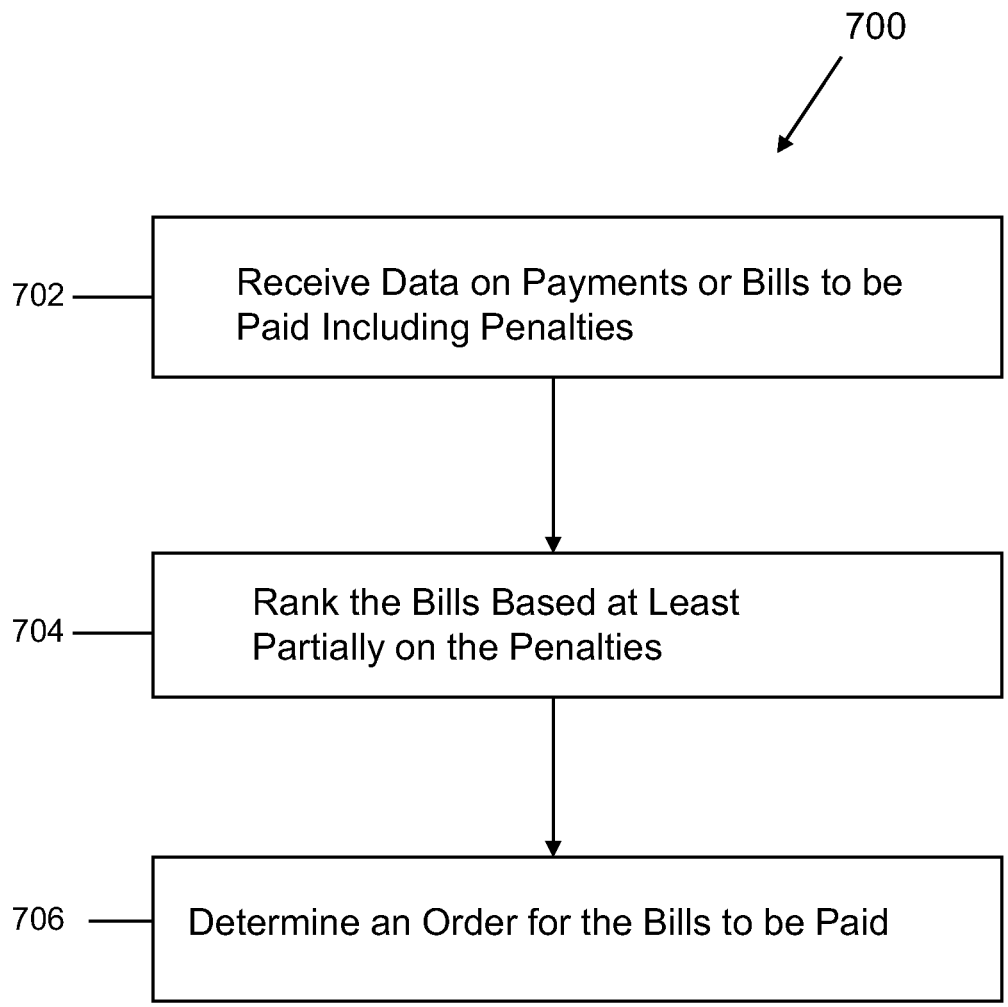
FIG. 7 is a flow chart of a method according to an example embodiment.

FIG. 7 illustrates a flow chart of a method 700 for determining an order or sequence for bills, loans or payments to be made. This method determines a payment order that minimizes any penalties that are incurred by the bill or loan paying party. Method 700 is performed at least partially using the bill paying service company computer system 108 (FIG. 1).

At 702, data is received about bills, loans and payments for a bill paying party that are to be paid including any penalties associated with late, or missed payments. This can include data retrieved from a bill or loan issuing company database or can be directly input by the bill paying party via a communication device such as over the internet. The data can include information such as the bill paying party's name, address, telephone number(s), email address(es), account numbers and bank account numbers. The data can include data about bills to be paid such as terms and conditions that apply when bills are paid late, not paid or are partially paid. The data can include information such as the bill issuing company's name, address, telephone number(s), email address(es), account numbers and bank account numbers. The data further can include amounts due, due dates, late fees, late fee due dates, minimum payments, loan balances, credit score effects, interest rate effects, line of credit effects and any other penalties for late or missed payments.

The data can be received by the bill paying service company computer system via a communication device such as over networks like internet or other electronic communication networks. The data may be in printed form and may be manually entered into bill paying service company database. Alternatively, the data may be entered using a semi-manual method such as electronic scanning or optical character recognition.

The data received at step 702 can be stored in a database or electronic memory device and used for other steps and systems so that additional computations can occur. Storage can be in the company database, for example, in electronic memory devices.

At 704, the bills, loans or payments are ranked based at least partially on the penalties that are applied for late, missed or partial payments. The ranking can be based on various criteria such as minimizing the cost of late fees, minimizing inertest rate charges, minimizing the effects on the bill payer's credit score or maximizing the bill payer's line of credit or any other criteria that the bill payer may deem to be appropriate.

At 706, an order or sequence of paying the bills, loans or payments is determined. The order or sequence can be based on various criteria such as using the previously determined rankings In an example, each of the ranking categories can be given a weighted percent and an overall payment order determined. In an example minimizing the cost of late fees may be given a 50% weight, minimizing inertest rate charges may be given a 30% weight, minimizing the effects on the bill payer's credit score may be given a 10% weight and maximizing the bill payer's line of credit may be given a 10% weight. The weighted ranking can determine the payment order or sequence. The bill paying service company computer system 108 (FIG. 1) can be programmed with programs, sub-routines and algorithms that determine the optimal payment order or sequence.

Method 700 determines or generates a sequence, order or hierarchy of bill payments that are the most advantageous for the bill paying party. The order of payments are determined that protect the bill paying customer from incurring any penalties or incurring the least penalties associated with missed or late payments. In an example, method 700 can determine that a mortgage payment has the highest priority for being paid on time and an electric bill has a lower priority for being paid on time. Method 700 can communicate a preferred payment order or sequence to the bill paying party by various means using communication system 109 (FIG. 1).

In an example, if the bill issuing party is an insurance company, method 700 may be used by the insurance company to determine which insurance policies should receive preferential payment on behalf of a customer. In other words, the order in which payments should be applied to multiple insurance policies. In this case, the bill payer can directly make payments to the bill issuer. Assume that an insurance customer has home, auto, life and health insurance policies with the insurance company. Method 700 can determine that the life and health insurance policies have the highest priority for payment and any funds received would first be applied toward those polices before any remaining portions of the payment are applied toward the home and auto insurance policies.

In an example, method 700 can be used to identify or determine one or more financial service providers that provide services with a minimum of penalties. Method 700 can collect data on several credit card providers or issuers, rank the credit card providers and recommend a preferred or best credit card provider. The ranking can be done using data on interest rates, late fees and credit score reporting.

Figure 8:
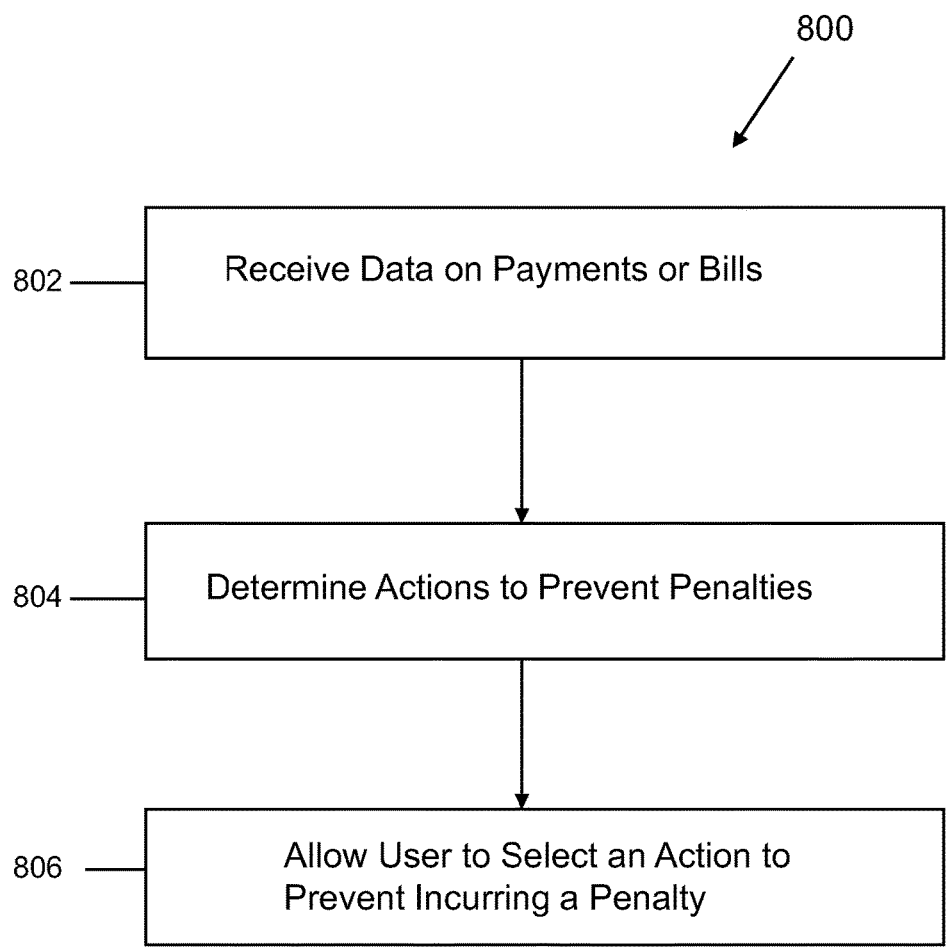
FIG. 8 is a flow chart of a method according to an example embodiment.

FIG. 8 illustrates a flow chart of a method 800 for allowing a bill payer to select actions to prevent incurring penalties from late, missed or partial payments. Method 800 is performed at least partially using the bill paying service company computer system 108 (FIG. 1).

At 802, data is received about bills, loans and payments for a bill paying party that are to be paid including any penalties associated with late, or missed payments. This can include data retrieved from a bill or loan issuing company database or can be directly input by the bill paying party via a communication device such as over the internet. The data can include information such as the bill paying party's name, address, telephone number(s), email address(es), account numbers and bank account numbers. The data can include data about bills to be paid such as terms and conditions that apply when bills are paid late, not paid or are partially paid. The data can include information such as the bill issuing company's name, address, telephone number(s), email address(es), account numbers and bank account numbers. The data further can include amounts due, due dates, late fees, late fee due dates, minimum payments, loan balances, credit score effects, interest rate effects, line of credit effects and any other penalties for late or missed payments.

The data can be received by the bill paying service company computer system via a communication device such as over networks like internet or other electronic communication networks. The data may be in printed form and may be manually entered into bill paying service company database. Alternatively, the data may be entered using a semi-manual method such as electronic scanning or optical character recognition.

The data received at step 802 can be stored in a database or electronic memory device and used for other steps and systems so that additional computations can occur. Storage can be in the company database, for example, in electronic memory devices.

At 804, actions to prevent penalties from being incurred are determined. In an example, the actions can include sending an alert or warning of the occurrence of a potential penalty event. The warnings can include sending e-mails, faxes, telephone calls and text messages before the date of the penalty event. The warning can further include the printing of separate warning letters or the printing of warnings on account statements. The actions can further include taking corrective actions to prevent or avert the occurrence of a penalty event. The corrective actions can include automatic payments of full, partial or minimum amounts of a bill or loan. Step 804 can include monitoring the due dates of penalties and determining actions to prevent the occurrence of the penalty.

At 806, the bill payer or user is allowed to select at least one action to prevent incurring a penalty for a late, missed or partial payment. In an example, a bill payer can select that a warning e-mail is sent 5 days before the occurrence of a penalty event reminding the bill payer to pay the bill. The bill payer can further select another action that if the bill remains unpaid on the due date, the full amount of the bill is to be paid. The bill payer can be presented with a menu of actions to choose from on a graphical user interface such as protective action selection form 500 (FIG. 5).

The bill paying service company computer system 108 (FIG. 1) can be programmed with programs, sub-routines and algorithms that determine the actions and allow the user to select at least one action to prevent incurring a penalty from late, missed or partial payments.

Figure 9:
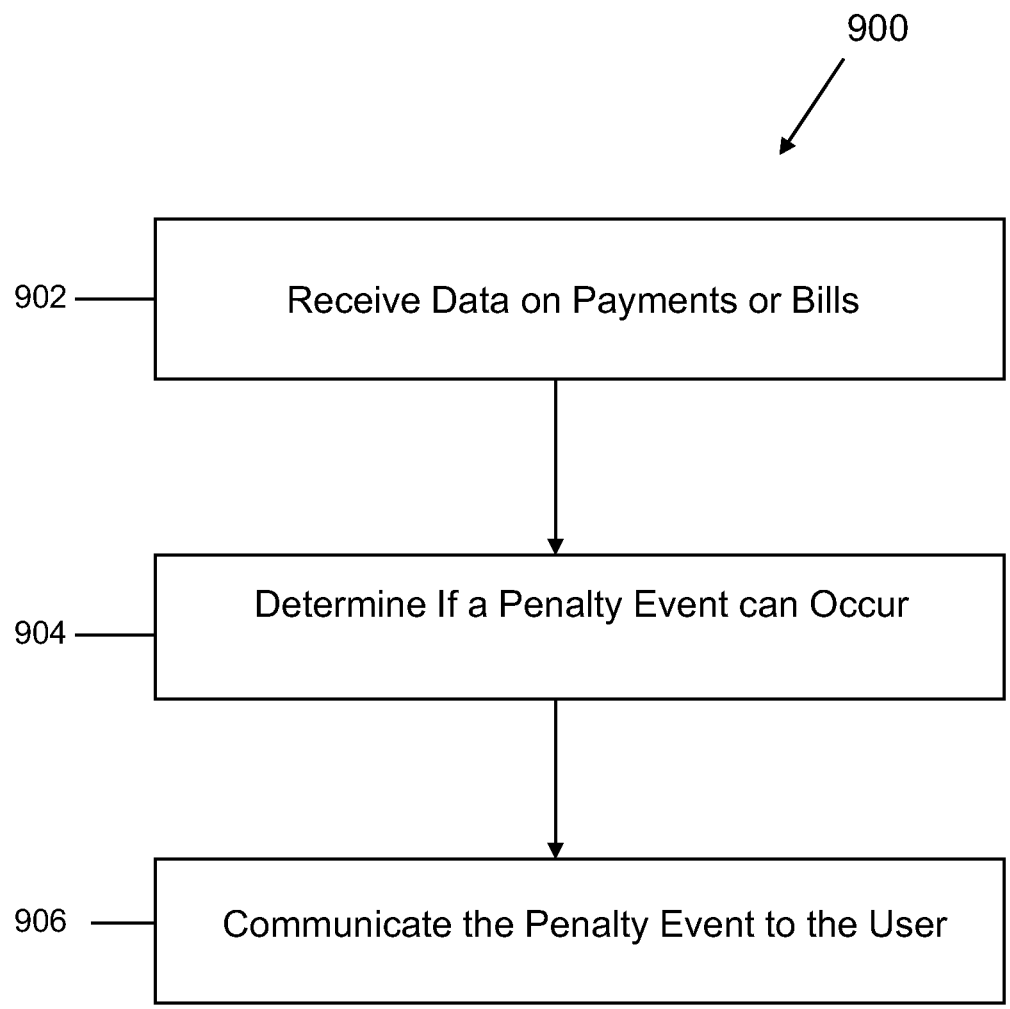
FIG. 9 is a flow chart of a method according to an example embodiment.

FIG. 9 illustrates a flow chart of a method 900 for notifying or communicating penalty events to bill a payer from late, missed or partial payments. Method 900 is performed at least partially using the bill paying service company computer system 108 (FIG. 1).

At 902, data is received about bills, loans and payments for a bill paying party that are to be paid including any penalties associated with late, or missed payments. This can include data retrieved from a bill or loan issuing company database or can be directly input by the bill paying party via a communication device such as over the internet. The data can include information such as the bill paying party's name, address, telephone number(s), email address(es), account numbers and bank account numbers. The data can include data about bills to be paid such as terms and conditions that apply when bills are paid late, not paid or are partially paid. The data can include information such as the bill issuing company's name, address, telephone number(s), email address(es), account numbers and bank account numbers. The data further can include amounts due, due dates, late fees, late fee due dates, minimum payments, loan balances, credit score effects, interest rate effects, line of credit effects and any other penalties for late or missed payments.

The data can be received by the bill paying service company computer system via a communication device such as over networks like internet or other electronic communication networks. The data may be in printed form and may be manually entered into bill paying service company database. Alternatively, the data may be entered using a semi-manual method such as electronic scanning or optical character recognition.

The data received at step 902 can be stored in a database or electronic memory device and used for other steps and systems so that additional computations can occur. Storage can be in the company database, for example, in electronic memory devices.

At 904, a determination is made as to if a penalty event will occur if a bill payment is late, missed or is partially paid. In an example, penalty events can include late fees, service cancellation, an interest rate increase, a line of credit decrease or a credit score decrease. Various other penalties associated with late, missed or partially paid bills can be determined in step 904. Step 904 can include monitoring the due dates of penalties and determining if a penalty event can occur. Step 904 can include determining the severity of any penalties and the effects of the penalty.

At 906, the occurrence or possible occurrence of a penalty event is communicated to the bill paying party or user. The bill paying party is notified or warned that a penalty event has occurred or will occur in the future. The warning of the occurrence of a potential penalty event is communicated to the bill paying party or user through at least one communication channel. The warnings or alerts can include sending e-mails, faxes, telephone calls and text messages before the date of the penalty event. The warning can further include the printing of separate warning letters or the printing of warnings on account statements. The bill paying service company computer system can automatically communicate penalty events through at least one communication channel. The communication of the warning may be monitored to ensure that it is received.

Method 900 provides a proactive method of altering a bill paying party to the effect of their bill paying decisions and actions.

In an example, the communication of the warning includes different levels or warning flags depending upon the severity of the penalty. A red warning flag can be communicated with a warning for a severe penalty. A yellow warning flag can be communicated with a warning for a moderate penalty. A green warning flag can be communicated with a warning for a slight penalty.

In an example, method 900 can use predictive sub-routines, models or algorithms to predict, determine and communicate to the bill paying party or user potential decisions or actions that the bill paying party can take to lower their interest rate, lower their fees and improve their credit score.

The bill paying service company computer system 108 (FIG. 1) can be programmed with programs, sub-routines and algorithms that determine if a penalty event can occur and communicate the penalty event to the bill paying party.

Figure 10:
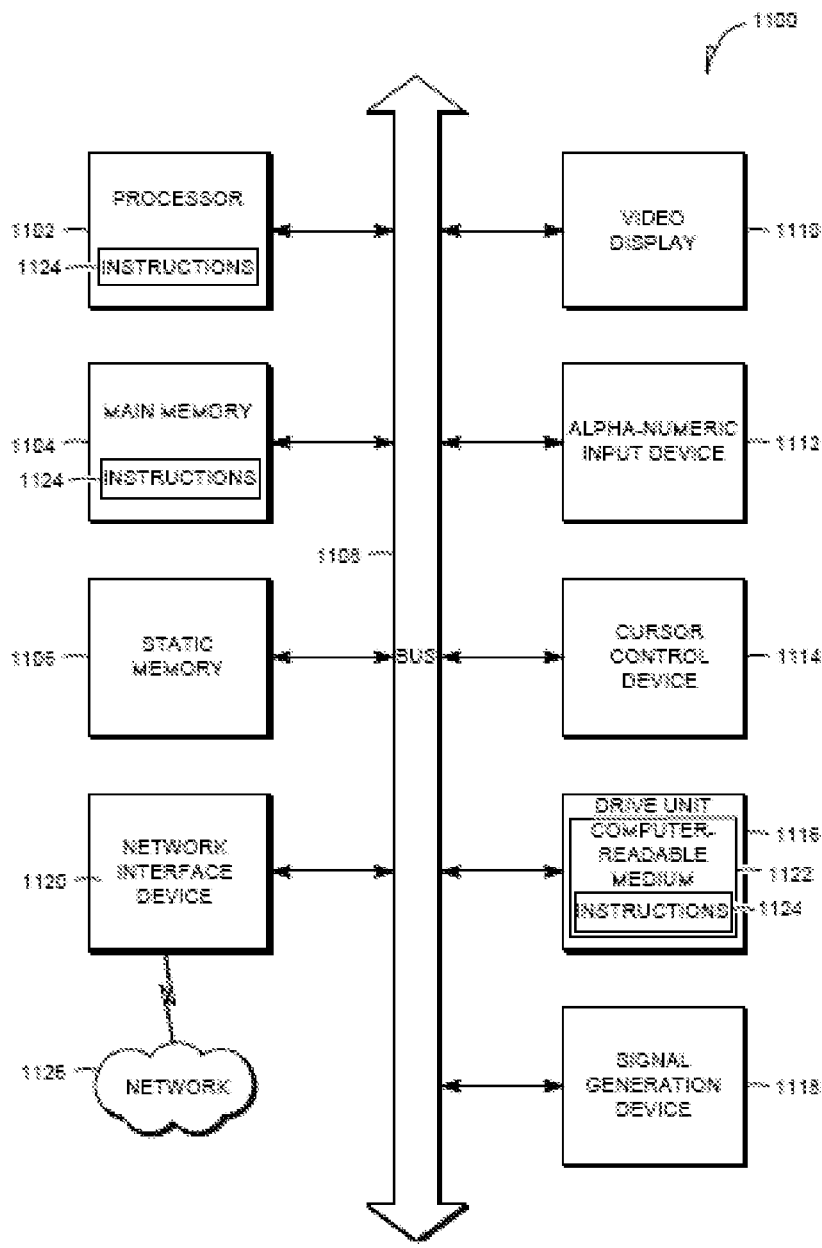
FIG. 10 is a schematic view of a subsystem according to an example embodiment.

FIG. 10 shows a diagrammatic representation of machine in the example form of a computer system 1100 within which a set of instructions may be executed causing the machine to perform any one or more of the methods, processes, operations, applications, or methodologies discussed herein. The computing systems of the bill paying service company 107 (FIG. 1) can include at least one of the computer systems 1100.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1110. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a drive unit 1116, a signal generation device 1118 (e.g., a speaker) and a network interface device 1120.

The drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

An example of a mobile device for use with the methods and systems described herein is self-powered wireless device capable of a wide-area or local wireless communication with a plurality of other of hand-held, mobile, self-powered wireless devices or with base stations that are at a fixed location. The hand-held, mobile, self-powered wireless device can contain a memory, a human input device, a display, and an imaging device. The memory stores a plurality of data relating to an application data, and other data. Hand-held as used in the present disclosure can be devices small enough to be held in a human's hand. Wireless network as used in the present disclosure can be a wireless network capable of transmitting data over thousands of feet, for example, a wireless telephone network or wireless computer network or a peer-to-peer network. Self-powered as used in the present disclosure describes a device that will have self-contained power available wherever the user wants to take the device away from a base or stationary source of power. In one example, self-powered devices can be powered by a rechargeable battery, e.g., a lithium-ion battery. In an example, a fuel cell can be the mobile, self-power source. In another example, a mobile device is not a fixed-location equipment such as desktop personal computer.

Aspects of the embodiments are operational with numerous other general purpose or special purpose computing environments or configurations can be used for a computing system. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The communication systems and devices as described herein can be used with various communication standards to connect. Examples include the Internet, but can be any network capable of communicating data between systems. other communication standards include a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface)

connection. Wireless communications can occur over a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. Communications networks may yet further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection.

The present methods and systems described herein can allow the bill paying service company to provide warnings and protective actions for a bill paying party in the event of late, missed or partial payments in an efficient and cost effective manner. The bill payments can be ranked based at least partially upon any penalties and the best order for the payments to be paid can be determined. Penalties for late, missed or partial payments can be determined and the bill paying party can select at least one action to prevent incurring the penalty. Protection and warnings are provided for one or more loans or bills from late, missed or partial payments. Penalty events for late, missed or partial payments can be determined and warnings about the penalty events can be communicated to the bill paying party. The use of the systems and methods of the present invention can result in cost savings to the bill paying party.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

Thus, methods and systems for population of an application have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computerized method comprising:
   receiving, from a payor, a selection of one or more protective actions to prevent penalties resulting from a penalty-incurring event;
   receiving one or more bills to be paid by the payor, the one or more bills received from one or more payees;
   detecting, using a processor, an approaching penalty-incurring event for one of the one or more bills;
   executing, using the processor, one of the one or more protective actions to prevent the approaching penalty-incurring event from occurring, the protective action responsive to detecting the approaching penalty-incurring event and in accordance with the payor's selection of the one or more protective actions; and
   generating, by the processor, a sequence of payments of the one or more bills, the sequence of the payments ordered by severity of the penalty,
      wherein generating the sequence of the payments ordered by the severity of the penalty includes assigning a weight to categories of the penalties, wherein the categories of the penalties includes one or more of: late fees, interest rate charges, lowering of credit score, and lowering of line of credit.

2. The computerized method of claim 1, further comprising collecting data from the one or more bills, wherein the data collected from the one or more bills includes penalty-incurring events and the penalties.

3. The computerized method of claim 1, further comprising matching each of the one or more bills with applicable penalties for penalty-incurring events from a database of the penalties.

4. The computerized method of claim 1, further comprising automatically collecting penalty data for at least the one of the one or more bills from a database based on a name of the one or more payees.

5. The computerized method of claim 1, wherein executing the one of the one or more protective actions includes one of sending a warning or paying the one of the one or more bills.

6. The computerized method of claim 1, wherein the approaching penalty-incurring event is one of a late, missed, or partial payment of the one or more bills, and wherein the penalties are at least one of a fee, a lowering of a line of credit, a lowering of a credit score, or a raising of an interest rate.

7. A non-transitory, computer-readable medium comprising computer-executable instructions, which, when executed by a processor, program the processor to execute a protective action, the computer-executable instructions comprising instructions for:
   receiving, from a payor, a selection of one or more protective actions to prevent penalties resulting from a penalty-incurring event;
   receiving one or more bills to be paid by the payor, the one or more bills received from one or more payees;
   detecting an approaching penalty-incurring event for one of the one or more bills;
   executing a protective action to prevent the approaching penalty-incurring event from occurring, the protective action responsive to detecting the approaching penalty-incurring event and in accordance with the payor's selection of the one or more protective actions; and generating a sequence of payments of the one or more bills, the sequence of the payments ordered by severity of the penalty, wherein generating the sequence of the payments ordered by the severity of the penalty includes assigning a weight to categories of the penalties, wherein the categories of penalties includes one or more of: late fees, interest rate charges, lowering of credit score, and lowering of line of credit.

8. The non-transitory, computer-readable medium of claim 7, wherein the computer-executable instructions further comprise instructions for:

detecting that a duplicate payment for the one of the one or more bills is about to be made; and warning the payor.

9. The non-transitory, computer-readable medium of claim 7, wherein the computer-executable instructions further comprise instructions for matching each of the one or more bills with applicable penalties for penalty-incurring events from a database of the penalties.

10. The non-transitory, computer-readable medium of claim 7, wherein the computer-executable instructions further comprise instructions for automatically collecting penalty data for at least the one of the one or more bills from a database based on a name of the one or more payees.

11. The non-transitory, computer-readable medium of claim 7, wherein the computer-executable instructions that execute the protective action further comprise instructions for ranking the one or more bills based on the penalties, wherein ranking the one or more bills includes a payment order that minimizes the penalties.

12. The non-transitory, computer-readable medium of claim 7, wherein the computer-executable instructions that execute one of the one or more protective actions includes computer-executable instructions to send a warning or pay the one of the one or more bills.

13. The non-transitory, computer-readable medium of claim 7, wherein the approaching penalty-incurring event is one of a late, missed, or partial payment of the one or more bills, and wherein the penalties are at least one of a fee, a lowering of a line of credit, a lowering of a credit score, or a raising of an interest rate.

14. A system comprising:

a means for receiving a selection of one or more protective actions to prevent penalties resulting from a penalty-incurring event;

a means for receiving one or more bills to be paid by a payor;

a means for detecting an approaching penalty-incurring event for one of the one or more bills;

a means for executing a protective action to prevent the approaching penalty-incurring event from occurring, the protective action responsive to detecting the approaching penalty-incurring event and in accordance with the payor's selection of the one or more protective actions; and a means for generating a sequence of payments of the one or more bills, the sequence of the payments ordered by severity of the penalty, wherein the means for generating the sequence of the payments ordered by the severity of the penalty includes a means for assigning a weight to categories of the penalties, wherein the categories of the penalties includes one or more of: late fees, interest rate charges, lowering of credit score, and lowering of line of credit.

15. The system of claim 14, further comprising a means for collecting data from the one or more bills, wherein the data collected from the one or more bills includes penalty-incurring events and the penalties.

16. The system of claim 14, further comprising a means for matching each of the one or more bills with applicable penalties for penalty-incurring events from a database of the penalties.

17. The system of claim 14, further comprising a means for automatically collecting penalty data for at least the one of the one or more bills from a database based on a name of one or more payees.

18. The system of claim 14, wherein executing one of the one or more protective actions includes one of sending a warning or paying a portion of the one of the one or more bills.

* * * * *